United States Patent
Larson

(10) Patent No.: US 8,891,874 B1
(45) Date of Patent: Nov. 18, 2014

(54) LEGIBILITY ANALYSIS OF TEXT IN AN ELECTRONIC DOCUMENT

(75) Inventor: Jerrod A. Larson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 816 days.

(21) Appl. No.: 12/941,003

(22) Filed: Nov. 5, 2010

(51) Int. Cl.
*G06K 9/00* (2006.01)

(52) U.S. Cl.
USPC .......................... 382/188; 382/187; 382/189

(58) Field of Classification Search
USPC ................... 382/181, 182, 231; 235/435, 440
See application file for complete search history.

(56) References Cited

U.S. PATENT DOCUMENTS

| | | | |
|---|---|---|---|
| 6,227,725 B1* | 5/2001 | Ancin et al. | 358/1.9 |
| 6,993,209 B1* | 1/2006 | Schowtka et al. | 382/298 |
| 7,136,511 B2 | 11/2006 | Harrington et al. | |
| 7,778,489 B1* | 8/2010 | Siegel et al. | 382/286 |
| 2007/0133842 A1* | 6/2007 | Harrington | 382/112 |
| 2009/0161958 A1* | 6/2009 | Markiewicz et al. | 382/186 |

OTHER PUBLICATIONS http://en.wikipedia.org/wiki/Typography.

* cited by examiner

*Primary Examiner* — Edward Park
(74) *Attorney, Agent, or Firm* — Hugh P. Gortler

(57) ABSTRACT

Legibility of text in an electronic document is analyzed. The analysis involves no more than the following three parameters: tracking between letters in the text; leading between lines of the text; and visual luminance contrast between the letters and text background.

9 Claims, 4 Drawing Sheets

LEGIBILITY ANALYSIS OF TEXT IN AN ELECTRONIC DOCUMENT

BACKGROUND

Typography is the art and technique of arranging type, type design, and modifying type glyphs. The arrangement of type involves the selection of typefaces, point size, line length, leading (line spacing), adjusting the spaces between groups of letters (tracking), adjusting the space between pairs of letters (kerning), etc. The legibility of a document is affected by the arrangement of these elements.

The task of arranging type was traditionally performed by professionals, such as editors, typesetters and graphic designers. However, computer authoring tools such as text editors have opened up typographic modifications to people who are not as skilled as professionals. Consequently, a lay person using a computer authoring tool might produce a document that is illegible or at least suboptimal with respect to legibility.

An illegible document might not be immediately apparent to a lay person who authors that document, and the author might not have access to a professional who can evaluate the document's legibility. Even if the author recognized that the document was not legible, the author might not know how to improve the document's legibility.

It is desirable to avoid creating illegible documents.

SUMMARY

According to an embodiment herein, a method comprises using a computer to analyze legibility of multi-line text in an electronic document. Only three parameters are analyzed: tracking between letters in the text, leading between lines of the text, and visual luminance contrast between the letters and text background.

According to another embodiment, an article comprises computer memory encoded with instructions that, when executed, cause a computer to analyze legibility of text in an electronic document. No more than the following three parameters are analyzed: tracking between letters in the text, leading between lines of the text, and visual luminance contrast between the letters and text background.

According to another embodiment, a system comprises an authoring component for creating electronic documents containing text; and a legibility analysis component for analyzing legibility of the text in the electronic documents. The legibility analysis component requires only three parameters for analysis: tracking between letters in the text, leading between lines of the text, and visual luminance contrast between the letters and text background. The parameters are analyzed independently of one another.

DETAILED DESCRIPTION

Figure 1:
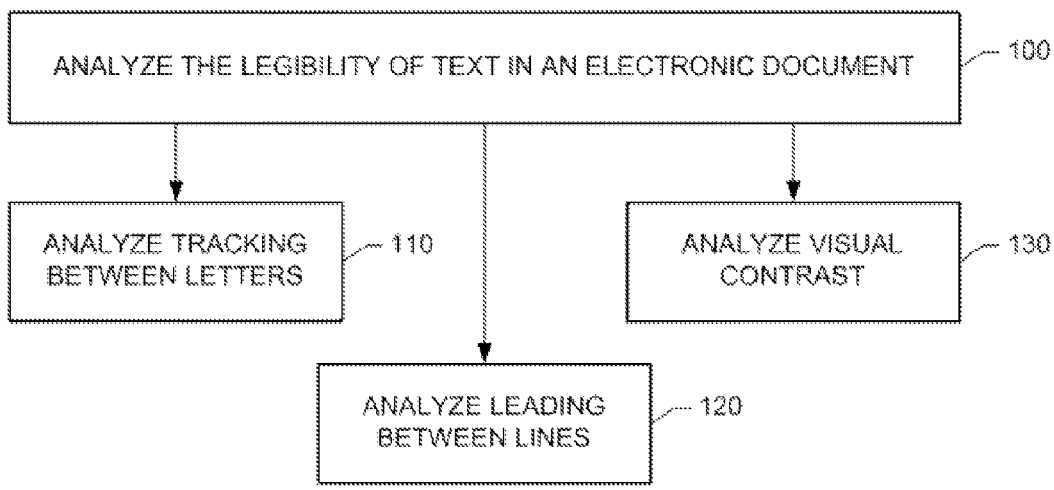
FIG. 1 is an illustration of a method of analyzing the legibility of text in an electronic document.

Reference is made to FIG. 1, which illustrates a method of analyzing the legibility of text in an electronic document (block 100). The method includes analyzing no more than the following three parameters: tracking between letters in the text; leading between lines of the text; and visual luminance contrast between the letters and text background. The applicant has analyzed many documents and has found that these three parameters (among many others) can be relied upon to analyze the legibility of documents. Relying on these three legibility parameters allows legibility analysis to be performed accurately and quickly, and it addresses a significant number of common legibility problems.

These three legibility parameters vary independently. They can be analyzed independently of one another, which further increases the speed of legibility analysis.

Moreover, these three legibility parameters can be adjusted independently of one another, which makes it easier to improve the legibility of a document. The adjustment of each of these parameters can be performed manually or automatically.

Figure 2:
FIG. 2 is an illustration of tracking between letters.

At block 110, tracking between letters in the text is analyzed. Tracking, also known as letter spacing, refers to the amount of space between letters in words to affect density in a line of text. Tracking is illustrated in FIG. 2.

Figure 3:
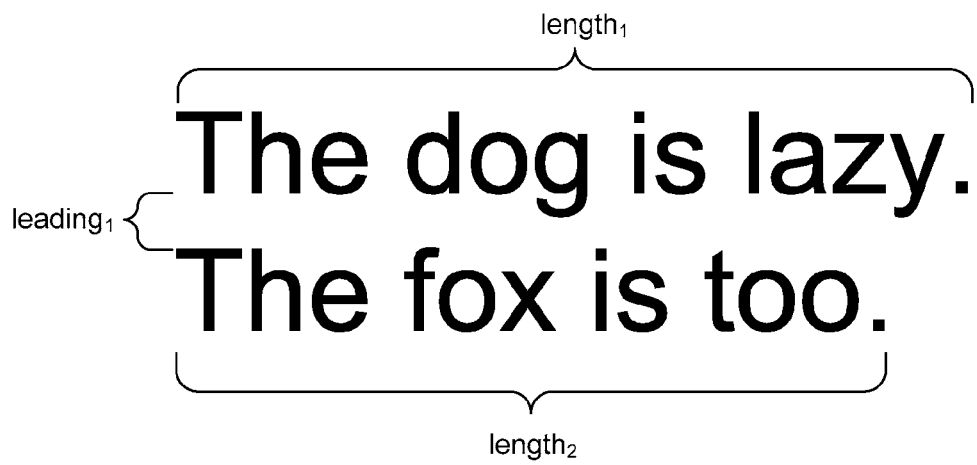
FIG. 3 is an illustration of leading between lines.

At block 120, leading between lines of text is analyzed. Leading, also known as line spacing, refers to the amount of added vertical spacing between lines of type. Leading is illustrated in FIG. 3.

Figure 4:
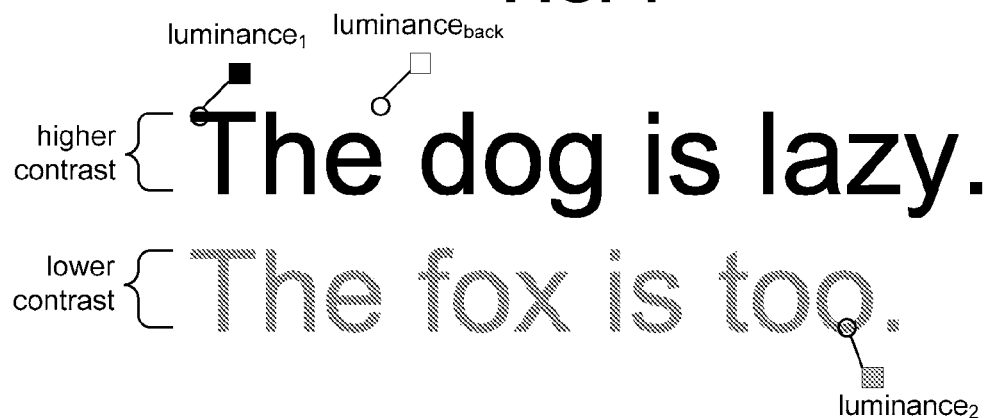
FIG. 4 is an illustration of visual luminance contrast.

At block 130, visual luminance contrast between the letters and text background is analyzed. Visual luminance contrast refers to the difference in contrast between type and the background on which it exists. Visual luminance contrast is illustrated in FIG. 4.

The parameters are analyzed independently of one another. Analysis of the parameters is not aggregated into a single numerical "score" or value. Rather, tracking is analyzed independently of leading, leading is analyzed independently of visual luminance contrast, and so forth. For example, if the legibility analysis indicates that the text is illegible due to tracking, then appropriate measures are taken. Separately, leading is analyzed. If the analysis indicates that the text is illegible due to leading, then appropriate measures are taken. Separately, visual luminance contrast is analyzed. If the analysis indicates that the text is illegible due to visual luminance contrast then appropriate measures are taken. Independent correction of each legibility parameter can be performed quickly.

Figure 5A:
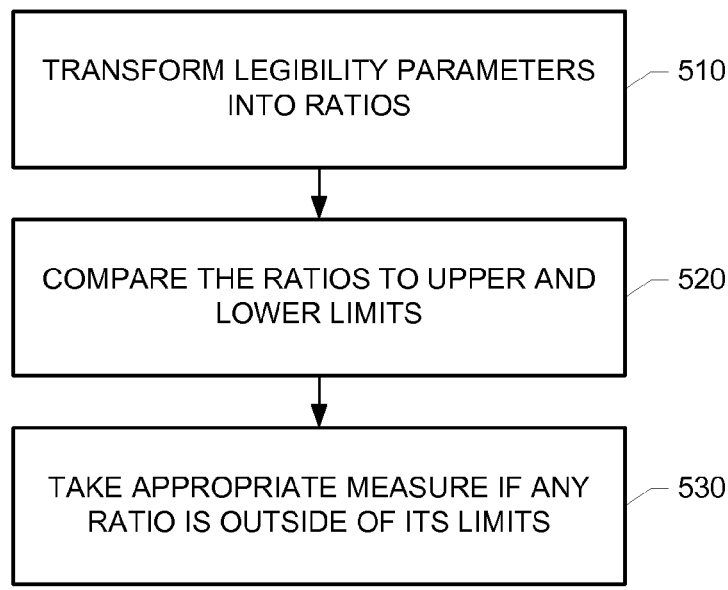
FIGS. 5*a* and 5*b* are illustrations of methods of analyzing legibility parameters.

Reference is now made to FIG. 5*a*, which illustrates a method of analyzing the legibility parameters. At block 510, the legibility parameters are transformed into ratios. For tracking, a ratio of tracking to the width of a character is computed. Thus, for the character "A" in FIG. 2, the tracking ratio is tracking:$width_A$, where $width_A$ is the width of the character.

For leading, a ratio of leading of a line to average length of lines in a body of text is computed. Thus, for the first line in FIG. 3, the leading ratio is $leading_1$:$((length_1+length_2)/2)$, where $leading_1$ is the leading between the first line and second line, $length_1$ is the length of the first line, and $length_2$ is the length of the second line.

For visual luminance contrast, a ratio of foreground luminance of a line to background luminance is computed. Thus, the visual luminance contrast ratio of the first line in FIG. 4 is $luminance_1$:$luminance_{back}$ and the visual luminance contrast ratio of the second line in FIG. 4 is $luminance_1$:

luminance$_{back}$. If the background luminance varies (e.g., the text is set against a gradient), the background luminance could be selected as the least amount of luminance contrast between the background and text.

At block 520, each ratio is compared to an upper limit and a lower limit. Ratios between the upper and lower limits are considered good. For example, the following ratios might be considered satisfactory:

a tracking ratio between 0.025:1 and 1:1.

a leading ratio between 1:35 and 1:70.

a visual luminance contrast ratio between 3:1 and 10:1.

These upper and lower limits may be preset values or values that are customized. The preset upper and lower limits may be calculated by experts.

Figure 5B:
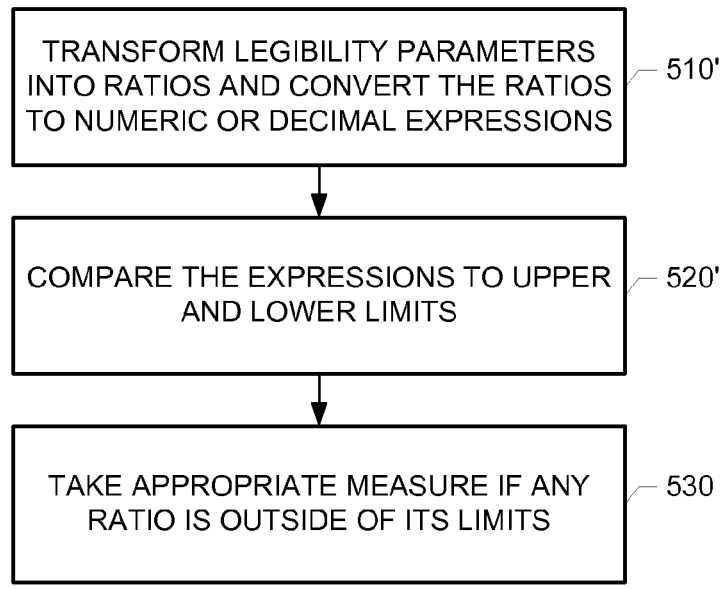

Reference is now made to FIG. 5b, which illustrates a similar method, except that at blocks 510' and 520', each ratio is transformed into a numeric or decimal expression, which is then compared to a preset upper limit and a preset lower limit. Measured values between the upper and lower limits are considered good. For example, the following decimal expressions of the legibility ratios might be considered satisfactory:

tracking between 0.25 and 1.0.

leading between 0.3 and 0.014.

visual contrast between 3.0 and 10.0.

FIGS. 5a and 5b also indicate (at block 530) that appropriate measures may be taken in the event a ratio or decimal expression does not fall between its upper and lower limits. In some embodiments, the text could be automatically adjusted so each parameter falls within its limits. In other embodiments, a user is informed that the text does not meet the legibility limits and is offered to adjust the text to fall between the limits.

The methods of FIGS. 5a and 5b are fast and simple to perform. By computing ratios for only three parameters and comparing each parameter to upper and lower limits, a method herein can be performed quickly in real time, as text is being entered by an authoring tool. The tracking can be analyzed and corrected as letters are being entered. The leading can be analyzed and corrected as lines are being entered. The visual luminance contrast can be analyzed and corrected before and after letters are being entered. For example, if a font color setting is changed, and the new color results in poor contrast, the color could be automatically adjusted to provide better contrast.

In some embodiments, luminance contrast can be evaluated with just one letter; tracking can be evaluated with just two, and leading can be evaluated with as few as two lines of text. Text can also be analyzed in chunks ranging from blocks, paragraphs, pages, entire documents, or series of documents (e.g., a set of manuals).

Some embodiments of the method are not limited to only analyzing tracking, leading and visual contrast. Additional parameters may be analyzed, such as kerning, visual accessibility, and rivers and widows and orphans.

Figure 6A:
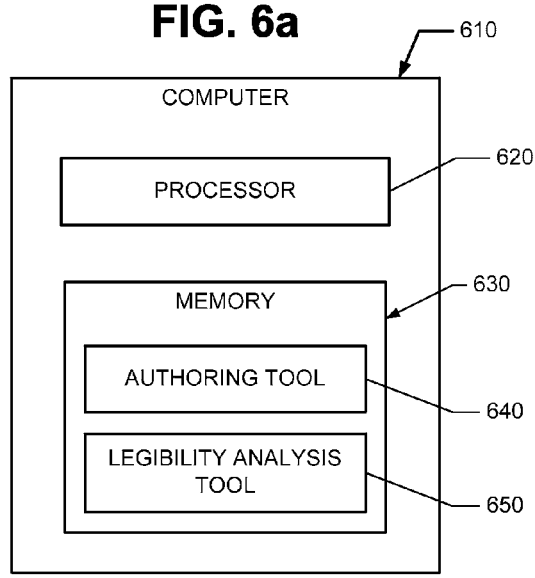
FIGS. 6*a* and 6*b* are illustrations of systems for analyzing the legibility of text in an electronic document.

Reference is now made to FIG. 6a, which illustrates a system for automatically analyzing the legibility of text in an electronic document. The system includes a computer 610 including a processor 620 and memory 630. The memory 630 stores an authoring tool 640. The authoring tool 640 is not limited to any particular type. Examples of authoring tools include, but are not limited to, word processing software, graphic design software, presentation software, content management software, and website development software.

The memory 630 also stores a legibility tool 650. The legibility tool 650 includes instructions that, when executed, cause the processor 620 to perform legibility analysis herein. The legibility tool 650 may be a standalone program.

Although FIG. 6a shows the authoring tool 640 and legibility tool 650 as separate tools, a system herein is not so limited. In some embodiments, the legibility tool 650 could be a subset of the authoring tool 640. For instance, the legibility tool 650 could be a feature activated from a menu in the authoring tool. The legibility tool 650 may be integrated with the authoring tool 640, provided as a plug-in, provided as a web service, etc. The legibility tool 650 could be executed automatically by the authoring tool 640 or invoked by the user.

Figure 6B:
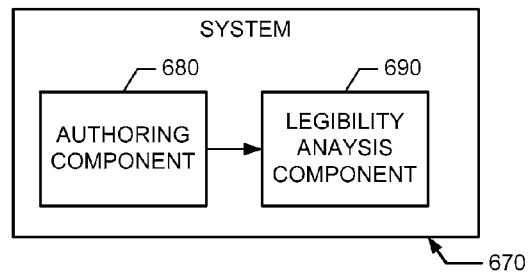

Reference is now made to FIG. 6b. A system 670 herein may be characterized as having a software authoring component 680 and a legibility analysis component 690.

Figure 7:
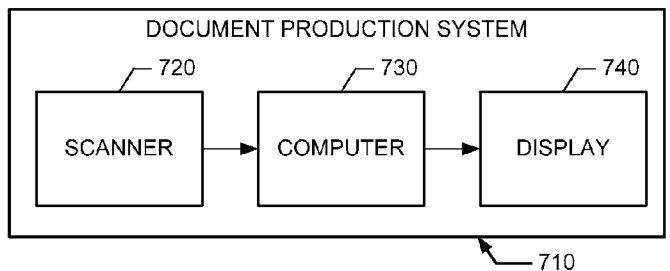
FIG. 7 is an illustration of a document production system including a computer for analyzing the legibility of text in images.

Reference is now made to FIG. 7. A method and system herein is not limited to an authoring tool that creates electronic documents containing text (e.g., PDF, DOC, DOCX, RTF, HTML). In some embodiments, the files may include image files (TIFF, JPG, BMP, GIF) containing text, and the legibility analysis could be performed by a document production system 710. The document production system 710 includes a scanner 720 for creating images of printed documents that contain text, and a computer 730 for analyzing the legibility of the text in the images. For instance, a document is scanned, the various components of the document (text glyphs, lines, background and foreground luminance values) are identified, the three parameters are analyzed, and the results of the legibility analysis of the printed document is displayed on a computer screen 740.

In still other embodiments, an image file can be converted to a document file by optical character recognition, and the document file can be analyzed for legibility.

The invention claimed is:

1. A method comprising using a computer to analyze legibility of multi-line text in an electronic document, wherein only three ratios are analyzed: a first ratio of character width and tracking between letters in the text; a second ratio of leading between lines of the text and average length of the lines; and a third ratio of visual luminance contrast between letters in the text and text background, the ratios analyzed independently of one another, each ratio compared to preset upper and lower legibility limits; wherein the lower and upper limits for the first ratio are 0.025:1 and 1:1.

2. The method of claim 1, further comprising using the computer to offer suggestions for improving the legibility.

3. The method of claim 1, further comprising using the computer to enter the text; wherein the text is analyzed as it is being entered.

4. An article comprising computer memory encoded with instructions that, when executed, cause a computer to analyze legibility of text in an electronic document, wherein only three ratios are analyzed: a first ratio of tracking between letters in the text and character width; a second ratio of leading between lines of the text and average length of the lines; and a third ratio of visual luminance contrast between the letters and text background, the ratios analyzed independently of one another, each ratio compared to preset upper and lower legibility limits; wherein the lower and upper limits for the second ratio are 1:35 and 1:70.

5. The article of claim 4, wherein the instructions further cause the computer to offer suggestions for improving the legibility.

6. The article of claim 4, wherein the memory is further encoded with an authoring tool for causing the computer to enter the text; wherein the text is analyzed as it is being entered.

7. A system comprising:
- an authoring component for creating electronic documents containing text; and
- a legibility analysis component for analyzing legibility of the text in the electronic documents, wherein only three ratios are required for analysis: a first ratio of tracking between letters in the text and character width; a second ratio of leading between lines of the text and average length of the lines; and a third ratio of visual luminance contrast between the letters and text background, the ratios analyzed independently of one another, each ratio compared to preset upper and lower legibility limits; wherein the lower and upper limits for the third ratio are 3:1 and 10:1.

8. The system of claim 7, wherein the legibility analysis component automatically analyzes the text as the text is being entered.

9. The system of claim 7, wherein the legibility analysis tool also offers suggestions for improving the legibility of the text in the electronic documents.

\* \* \* \* \*